United States Patent
Okabe

(10) Patent No.: US 12,512,690 B2
(45) Date of Patent: Dec. 30, 2025

(54) VEHICLE ELECTRICITY STORAGE SYSTEM

(71) Applicant: HONDA MOTOR CO., LTD., Tokyo (JP)

(72) Inventor: Hiroto Okabe, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 747 days.

(21) Appl. No.: 17/863,001

(22) Filed: Jul. 12, 2022

(65) Prior Publication Data
US 2023/0025686 A1 Jan. 26, 2023

(30) Foreign Application Priority Data
Jul. 16, 2021 (JP) .................................. 2021-118300

(51) Int. Cl.
*H02J 7/00* (2006.01)
*B60L 53/60* (2019.01)
(Continued)

(52) U.S. Cl.
CPC ........ *H02J 7/007182* (2020.01); *B60L 53/60* (2019.02); *B60L 58/12* (2019.02);
(Continued)

(58) Field of Classification Search
None
See application file for complete search history.

(56) References Cited

U.S. PATENT DOCUMENTS

| | | |
|---|---|---|
| 2003/0067282 A1 | 4/2003 | Arai et al. |
| 2006/0087291 A1 | 4/2006 | Yamauchi |
| 2007/0145954 A1 | 6/2007 | Kawahara et al. |
| 2009/0174369 A1 | 7/2009 | Kawahara et al. |

(Continued)

FOREIGN PATENT DOCUMENTS

| | | | |
|---|---|---|---|
| CA | 2651144 A1 * | 11/2007 | ............ B60L 11/123 |
| JP | 2003-114264 A | 4/2003 | |

(Continued)

OTHER PUBLICATIONS

May 30, 2023, Translation of Japanese Office Action issued for related JP Application No. 2021-118300.

*Primary Examiner* — Julian D Huffman
*Assistant Examiner* — John P Ondrasik
(74) *Attorney, Agent, or Firm* — Paratus Law Group, PLLC

(57) ABSTRACT

A vehicle electricity storage system includes a control device including: a calculation unit configured to calculate an internal resistance value of the battery based on the voltage value and the current value; a derivation unit configured to derive an estimated internal resistance value, which is an estimated value of the current internal resistance of the battery, based on the calculated internal resistance value calculated and the current voltage value; and a setting unit configured to set a charging electricity upper limit value, which is an upper limit value of charging electricity for charging the battery, based on the derived estimated internal resistance value, the current voltage value, and a current value at present. The derivation unit is configured to derive a greater value as the estimated internal resistance value, as a difference between an upper limit voltage value of the battery and the current voltage value becomes smaller.

7 Claims, 5 Drawing Sheets

(51) Int. Cl.
- *B60L 58/12* (2019.01)
- *B60W 20/00* (2016.01)
- *G01R 31/3842* (2019.01)
- *G01R 31/389* (2019.01)
- *H01M 10/44* (2006.01)
- *H01M 10/48* (2006.01)

(52) U.S. Cl.
CPC ....... *G01R 31/3842* (2019.01); *G01R 31/389* (2019.01); *H01M 10/441* (2013.01); *H01M 10/482* (2013.01); *H02J 7/0047* (2013.01); *H02J 7/00714* (2020.01); *B60L 2240/547* (2013.01); *B60L 2240/549* (2013.01); *B60W 20/00* (2013.01); *B60W 2510/244* (2013.01); *B60W 2710/244* (2013.01); *H01M 2220/20* (2013.01)

(56) References Cited

U.S. PATENT DOCUMENTS

| | | | |
|---|---|---|---|
| 2012/0274285 A1* | 11/2012 | Chawla | H01M 10/44 |
| | | | 320/127 |
| 2015/0191092 A1 | 7/2015 | Saint-Marcoux et al. | |
| 2015/0326038 A1 | 11/2015 | Lee | |
| 2016/0233693 A1 | 8/2016 | Suzuki | |
| 2020/0088805 A1* | 3/2020 | Cha | H01M 10/443 |

FOREIGN PATENT DOCUMENTS

| | | | |
|---|---|---|---|
| JP | 2006-129588 A | | 5/2006 |
| JP | 2012-110221 A | | 6/2012 |
| JP | 2015-119558 A | | 6/2015 |
| JP | 2015-528270 A | * | 9/2015 |
| KR | 20020054175 A | * | 7/2002 |

* cited by examiner

VEHICLE ELECTRICITY STORAGE SYSTEM

CROSS-REFERENCE TO RELATED APPLICATIONS

This application is based on and claims priority under 35 USC 119 from Japanese Patent Application No. 2021-118300 filed on Jul. 16, 2021, the contents of which are incorporated herein by reference.

TECHNICAL FIELD

The present invention relates to a vehicle electricity storage system.

BACKGROUND ART

In recent years, as a specific measure against global climate change, efforts for realizing a low-carbon society or a decarbonized society are active. Even in vehicles, there is a strong demand for reduction of $CO_2$ emissions, and electrification of drive sources rapidly progresses.

Specifically, vehicles including an electric motor as a drive source and a battery as a secondary battery capable of supplying electricity to the electric motor, such as electrical vehicles and hybrid electrical vehicles (hereinafter also referred to as "electric vehicles"), are developed.

In the electric vehicles, it is desired to appropriately control charge and discharge of the battery. For example, JP-A-2006-129588 discloses a technique of determining a function of a current-voltage characteristic of the secondary battery based on a charge and discharge current flowing through the secondary battery and a charge and discharge voltage, obtaining a discharge limit current and/or a charge limit current from an intersection of the determined function and a predetermined lower limit voltage and/or a predetermined upper limit voltage, and implementing control so that a current greater than or equal to the calculated discharge limit current and/or a current less than or equal to the calculated charge limit current does not flow through the secondary battery.

Generally, a battery has a non-linear current-voltage characteristic (hereinafter also referred to as "IV characteristic"), and an internal resistance of the battery changes in conjunction with the IV characteristic. Specifically, as shown by an equivalent circuit model 500 of a battery illustrated in FIG. 5, the battery includes a direct current voltage source 510 (shown as "open circuit voltage (OCV)"), and an internal resistance 520. The internal resistance 520 of the battery includes an RC parallel component (see, for example, reference numerals 521 and 522 in FIG. 5). The RC parallel component tends to increase when an absolute value of a current value of the battery increases, and tends to decrease when the absolute value of the current value of the battery decreases, which leads to fluctuation of a resistance value of the internal resistance 520. In order to properly control the charging or discharging of the battery, it is necessary to consider the internal resistance that changes in conjunction with the IV characteristic of the battery in this way, but there is still room for improvement in this point in the related art.

The present invention provides a vehicle electricity storage system that enables appropriate control of battery charging or discharging in consideration of the internal resistance that changes in conjunction with the IV characteristic of the battery.

SUMMARY

A vehicle electricity storage system includes: a battery; a voltage sensor configured to detect a voltage value of the battery; a current sensor configured to detect a current value of the battery; and a control device configured to control charging of the battery based on the voltage value detected by the voltage sensor and the current value detected by the current sensor. The control device includes a calculation unit configured to calculate an internal resistance value of the battery based on the voltage value and the current value; a derivation unit configured to derive an estimated internal resistance value, which is an estimated value of the current internal resistance of the battery, based on the internal resistance value calculated by the calculation unit and the current voltage value; and a setting unit configured to set a charging electricity upper limit value, which is an upper limit value of charging electricity for charging the battery, based on the estimated internal resistance value derived by the derivation unit, the current voltage value, and a current value at present. The derivation unit is configured to derive a greater value as the estimated internal resistance value, as a difference between an upper limit voltage value of the battery and the current voltage value becomes smaller.

A vehicle electricity storage system includes: a battery; a voltage sensor configured to detect a voltage value of the battery; a current sensor configured to detect a current value of the battery; and a control device configured to control discharging from the battery based on the voltage value detected by the voltage sensor and the current value detected by the current sensor. The control device includes a calculation unit configured to calculate an internal resistance value of the battery based on the voltage value and the current value, a derivation unit configured to derive an estimated internal resistance value, which is an estimated value of the current internal resistance of the battery, based on the internal resistance value calculated by the calculation unit and the current voltage value, and a setting unit configured to set a discharging electricity upper limit value, which is an upper limit value of discharging electricity discharged from the battery, based on the estimated internal resistance value derived by the derivation unit, the current voltage value, and a current value at present. The derivation unit is configured to derive a greater value as the estimated internal resistance value, as a difference between a lower limit voltage value of the battery and the current voltage value becomes smaller.

The present invention can provide a vehicle electricity storage system that enables appropriate control of battery charging or discharging in consideration of the internal resistance that changes in conjunction with the IV characteristic of the battery.

BRIEF DESCRIPTION OF DRAWINGS

Exemplary embodiments of the present invention will be described in detail based on the following figures, wherein.

DESCRIPTION OF EMBODIMENTS

Hereinafter, an embodiment of a vehicle electricity storage system of the present invention will be described in detail with reference to the drawings.

[Vehicle]

Figure 1:
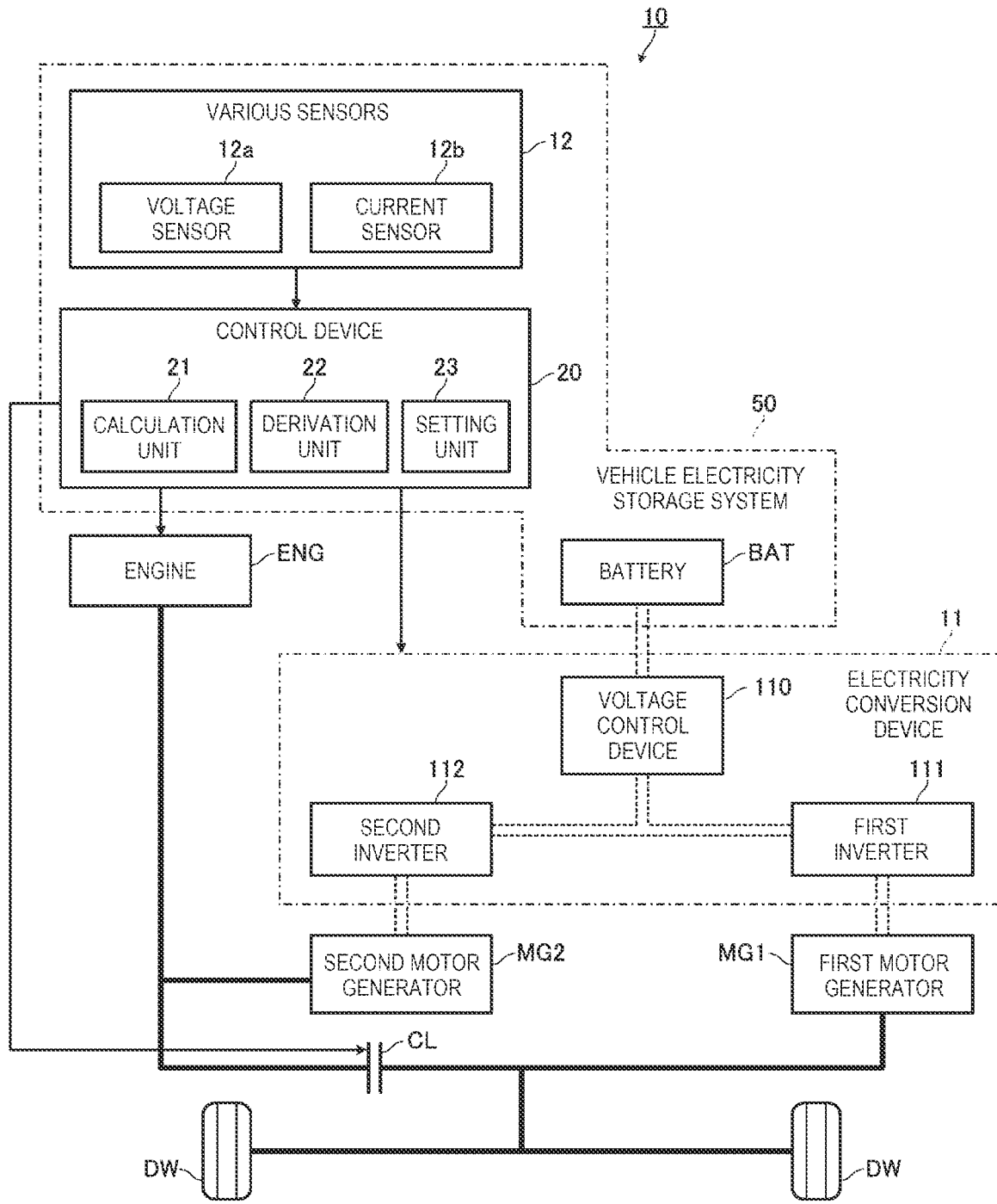
FIG. 1 is a diagram showing a schematic configuration of a vehicle 10.

First, a vehicle equipped with the vehicle electricity storage system of the present embodiment will be described. As shown in FIG. 1, a vehicle 10 equipped with a vehicle electricity storage system 50 of the present embodiment is a hybrid electric vehicle, and includes an engine ENG, a first motor generator MG1, a second motor generator MG2, a battery BAT, a clutch CL, an electricity conversion device 11, various sensors 12, and a control device 20. In FIG. 1, a thick solid line indicates mechanical connection, a double dotted line indicates electrical wiring, and a thin solid line arrow indicates transmission or reception of a control signal or a detection signal.

The engine ENG is, for example, a gasoline engine or a diesel engine, and outputs power generated by burning supplied fuel. The engine ENG is connected to the second motor generator MG2 and is connected to drive wheels DW of the vehicle 10 via the clutch CL. The power output from the engine ENG (hereinafter also referred to as "output of the engine ENG") is transmitted to the second motor generator MG2 in a case where the clutch CL is in a disconnected state, and is transmitted to the second motor generator MG2 and the drive wheels DW in a case where the clutch CL is in a connected state (engaged state). The second motor generator MG2 and the clutch CL will be described later.

The first motor generator MG1 is a motor generator mainly used as a drive source of the vehicle 10 (so-called driving motor), such as an alternating current motor. The first motor generator MG1 is electrically connected to the battery BAT and the second motor generator MG2 via the electricity conversion device 11. Electricity of at least one of the battery BAT and the second motor generator MG2 may be supplied to the first motor generator MG1. The first motor generator MG1 operates as an electric motor by being supplied with the electricity, and outputs power for the vehicle 10 to travel. In addition, the first motor generator MG1 is connected to the drive wheels DW, and the power output from the first motor generator MG1 (hereinafter also referred to as "output of the first motor generator MG1") is transmitted to the drive wheels DW. The vehicle 10 travels by transmitting (that is, supplying) at least one of the output of the engine ENG and the output of the first motor generator MG1 to the drive wheels DW.

In addition, the first motor generator MG1 performs a regenerative operation as an electricity generator when the vehicle 10 is braked (when the vehicle 10 is rotated by the engine ENG or the drive wheels DW) to generate electricity (so-called regenerative electricity generation). The electricity generated by the regenerative operation of the first motor generator MG1 (hereinafter also referred to as "regenerative electricity") is supplied to the battery BAT via the electricity conversion device 11 for example. In this way, the battery BAT can be charged by the regenerative electricity.

The regenerative electricity may not be supplied to the battery BAT, and may be supplied to the second motor generator MG2 via the electricity conversion device 11. By supplying the regenerative electricity to the second motor generator MG2, it is possible to perform "electricity waste", which means that the regenerative electricity is consumed without charging the battery BAT. During the electricity waste, the regenerative electricity supplied to the second motor generator MG2 is used for driving the second motor generator MG2, and power generated thereby is input to the engine ENG to be consumed by mechanical friction loss of the engine ENG and the like.

The second motor generator MG2 is a motor generator mainly used as an electricity generator (so-called electricity generation motor), such as an alternating current motor. The second motor generator MG2 is driven by the power of the engine ENG to generate electricity. The electricity generated by the second motor generator MG2 is supplied to at least one of the battery BAT and the first motor generator MG1 via the electricity conversion device 11. By supplying the electricity generated by the second motor generator MG2 to the battery BAT, the battery BAT can be charged with the electricity. In addition, by supplying the electricity generated by the second motor generator MG2 to the first motor generator MG1, the first motor generator MG1 can be driven by the electricity.

The electricity conversion device 11 is a device that converts input electricity and outputs the converted electricity (also referred to as a so-called power control unit "PCU"), and is connected to the first motor generator MG1, the second motor generator MG2, and the battery BAT. For example, the electricity conversion device 11 includes a first inverter 111, a second inverter 112, and a voltage control device 110. The first inverter 111, the second inverter 112, and the voltage control device 110 are electrically connected to each other.

The voltage control device 110 converts an input voltage and outputs the converted voltage. A DC/DC converter or the like can be used as the voltage control device 110. For example, when electricity of the battery BAT is supplied to the first motor generator MG1, the voltage control device 110 boosts an output voltage of the battery BAT and then outputs the boosted output voltage to the first inverter 111. For example, when the regenerative electricity generation is performed by the first motor generator MG1, the voltage control device 110 steps down an output voltage of the first motor generator MG1 received via the first inverter 111 and then outputs the stepped-down output voltage to the battery BAT. When electricity is generated by the second motor generator MG2, the voltage control device 110 steps down an output voltage of the second motor generator MG2 received via the second inverter 112 and then outputs the stepped-down output voltage to the battery BAT.

When electricity of the battery BAT is supplied to the first motor generator MG1, the first inverter 111 converts the electricity (direct current) of the battery BAT received via the voltage control device 110 into an alternating current and then outputs the alternating current to the first motor generator MG1. When the first motor generator MG1 performs the regenerative electricity generation, the first inverter 111 converts the electricity (alternating current) received from the first motor generator MG1 to a direct current and then outputs the direct current to the voltage control device 110. When regenerative electricity of the first motor generator MG1 is wasted, the first inverter 111 converts the electricity (alternating current) received from the first motor generator MG1 into a direct current and then outputs the direct current to the second inverter 112.

When electricity is generated by the second motor generator MG2, the second inverter 112 converts the electricity (alternating current) received from the second motor generator MG2 into a direct current and then outputs the direct current to the voltage control device 110. When the regenerative electricity of the first motor generator MG1 is wasted, the second inverter 112 converts the regenerative electricity (direct current) of the first motor generator MG1 received via the first inverter 111 into an alternating current and then outputs the alternating current to the second motor generator MG2.

The battery BAT is a chargeable and dischargeable secondary battery, and includes a plurality of electricity storage cells connected in series or in series and parallel. The battery BAT is configured to be able to output a high voltage such as 100 [V] to 400 [V] as a terminal voltage. As the electricity storage cell of the battery BAT, a lithium ion battery, a nickel hydrogen battery, or the like can be used.

The clutch CL can take the connected state in which a power transmission path from the engine ENG to the drive wheels DW is connected (engaged), and the disconnected state in which the power transmission path from the engine ENG to the drive wheels DW is disconnected (blocked). The output of the engine ENG is transmitted to the drive wheels DW when the clutch CL is in the connected state, and is not transmitted to the drive wheels DW when the clutch CL is in the disconnected state.

The various sensors 12 include, for example, a vehicle speed sensor that detects a traveling speed of the vehicle 10 (hereinafter also referred to as a "vehicle speed"), an accelerator position (hereinafter also referred to as "AP") sensor that detects an operation amount on an accelerator pedal of the vehicle 10, a brake sensor that detects an operation amount on a brake pedal of the vehicle 10, and a battery sensor that detects various types of information related to the battery BAT.

The battery sensor includes a voltage sensor 12a that detects a voltage value V of the battery BAT, a current sensor 12b that detects a current value I of the battery BAT, and the like. The voltage sensor 12a detects a closed circuit voltage of the battery BAT as the voltage value V of the battery BAT. The current sensor 12b detects a current value of an input and output current of the battery BAT as the current value I of the battery BAT. In the present embodiment, the current value I of the battery BAT takes a positive value when the battery BAT is discharged and takes a negative value when the battery BAT is charged.

Detection results of the various sensors 12 including the voltage sensor 12a and the current sensor 12b are transmitted to the control device 20 as detection signals. In addition to the voltage sensor 12a and the current sensor 12b, the various sensors 12 (for example, a battery sensor) may also include, for example, a temperature sensor that detects a temperature of the battery BAT.

The control device 20 is provided so as to be able to communicate with the engine ENG, the clutch CL, the electricity conversion device 11, and the various sensors 12. The control device 20 controls the output of the engine ENG, controls the output of the first motor generator MG1 or the second motor generator MG2 by controlling the electricity conversion device 11, and controls a state of the clutch CL.

Further, the control device 20 is configured to be able to control at least one of charging and discharging of the battery BAT. For example, when the control device 20 is configured to be able to control the charging of the battery BAT, the control device 20 sets an upper limit value of a charging electricity for charging the battery BAT (a charging electricity upper limit value $TW_{IN\_now}$ described later), and controls the charging so that no charging electricity exceeding the upper limit value is supplied to the battery BAT when the battery BAT is charged. When the control device 20 is configured to be able to control the discharging of the battery BAT, the control device 20 sets an upper limit value of a discharging electricity discharged from the battery BAT (a discharging electricity upper limit value $TW_{OUT\_now}$ described later), and controls the discharging so that no discharging electricity exceeding the upper limit value is discharged from the battery BAT when the battery BAT is discharged. Since a specific example of charging and discharging control by the control device 20 will be described later, description thereof is omitted here.

The control device 20 can be implemented by, for example, an electronic control unit (ECU) including a processor that performs various calculations, a storage device that stores various types of information, an input and output device that controls input and output of data between an inside and an outside of the control device 20, and the like. The control device 20 may be implemented by a single ECU, or may be implemented by cooperation of a plurality of ECUs.

The vehicle electricity storage system 50 of the present embodiment includes the battery BAT, the various sensors 12 (specifically, the voltage sensor 12a and the current sensor 12b), and the control device 20 described above.

[Traveling Modes of Vehicle]

Next, traveling modes of the vehicle 10 will be described. The vehicle 10 can take an EV traveling mode, a hybrid traveling mode, and an engine traveling mode as the traveling modes. The vehicle 10 travels in any one of the traveling modes. Under which traveling mode the vehicle 10 is driven in is controlled by the control device 20.

[EV Traveling Mode]

The EV traveling mode is a traveling mode in which only the electricity of the battery BAT is supplied to the first motor generator MG1 and the vehicle 10 is driven by the power output from the first motor generator MG1 in accordance with the electricity.

Specifically, in the EV traveling mode, the control device 20 sets the clutch CL to the disconnected state. In the EV traveling mode, the control device 20 stops supply of fuel to the engine ENG (performs so-called fuel cut), and stops the output of the power from the engine ENG. Therefore, in the EV traveling mode, electricity generation by the second motor generator MG2 is not performed. In addition, in the EV traveling mode, the control device 20 performs control so that only the electricity of the battery BAT is supplied to the first motor generator MG1, and the first motor generator MG1 outputs power corresponding to the electricity to drive the vehicle 10 by the power.

The control device 20 performs control so that the vehicle 10 travels under the EV traveling mode on a condition that only the electricity from the battery BAT is supplied to the first motor generator MG1 and a driving force required for traveling of the vehicle 10 (hereinafter also referred to as "required driving force") is obtained by the power output from the first motor generator MG1 in accordance with the electricity.

[Hybrid Traveling Mode]

The hybrid traveling mode is a traveling mode in which at least the electricity generated by the second motor generator MG2 is supplied to the first motor generator MG1, and the vehicle 10 is mainly driven by the power output by the first motor generator MG1 in accordance with the electricity.

Specifically, in the hybrid traveling mode, the control device 20 sets the clutch CL to the disconnected state. In addition, in the hybrid traveling mode, the control device 20 performs control so that the fuel is supplied to the engine ENG, the engine ENG outputs the power, and the second motor generator MG2 is driven by the power of the engine ENG. Accordingly, in the hybrid traveling mode, the electricity is generated by the second motor generator MG2. In the hybrid traveling mode, the control device 20 performs control so that the power transmission path is set to a disconnected state by the clutch CL, the electricity generated by the second motor generator MG2 is supplied to the first motor generator MG1, and the first motor generator MG1 outputs power corresponding to the electricity to drive the vehicle 10 by the power.

The electricity supplied from the second motor generator MG2 to the first motor generator MG1 is greater than the electricity supplied from the battery BAT to the first motor generator MG1. Therefore, in the hybrid traveling mode, as compared with the EV traveling mode, the output of the first motor generator MG1 can be increased, and a large driving force can be obtained as a driving force for causing the vehicle 10 to travel (hereinafter also referred to as "output of the vehicle 10").

In the hybrid traveling mode, the control device 20 may also supply the electricity of the battery BAT to the first motor generator MG1 as necessary. That is, in the hybrid traveling mode, the control device 20 may supply the electricity of both the second motor generator MG2 and the battery BAT to the first motor generator MG1. Accordingly, as compared with the case where only the electricity of the second motor generator MG2 is supplied to the first motor generator MG1, the electricity supplied to the first motor generator MG1 can be increased, and a greater driving force can be obtained as the output of the vehicle 10.

[Engine Traveling Mode]

The engine traveling mode is a traveling mode in which the vehicle 10 is mainly driven by the power output from the engine ENG.

Specifically, in the engine traveling mode, the control device 20 sets the clutch CL to the connected state. In the engine traveling mode, the control device 20 performs control so that the fuel is supplied to the engine ENG, and the power is output from the engine ENG. In the engine traveling mode, since the power transmission path is in the connected state by the clutch CL, the power of the engine ENG is transmitted to the drive wheels DW to drive the drive wheels DW. In this way, in the engine traveling mode, the control device 20 performs control so that the power is output from the engine ENG, and the vehicle 10 is driven by the power.

In the engine traveling mode, the control device 20 may also supply the electricity of the battery BAT to the first motor generator MG1 as necessary. Accordingly, in the engine traveling mode, the vehicle 10 can be driven by the power output from the first motor generator MG1 by the supply of the electricity of the battery BAT, and a greater driving force can be obtained as the output of the vehicle 10 as compared with the case where the vehicle 10 is driven only by the power of the engine ENG. As a result, the output of the engine ENG can be reduced and fuel efficiency of the vehicle 10 can be improved as compared with the case where the vehicle 10 is driven only by the power of the engine ENG.

[Control Device]

Next, a functional configuration of the control device 20 will be described. As shown in FIG. 1, the control device 20 includes, for example, a calculation unit 21, a derivation unit 22, and a setting unit 23, as functional units implemented by a processor executing a program stored in the storage device of the control device 20.

The calculation unit 21 calculates an internal resistance value R of the battery BAT based on the voltage value V of the battery BAT detected by the voltage sensor 12a and the current value I of the battery BAT detected by the current sensor 12b. The internal resistance value R of the battery BAT at a certain time can be calculated by dividing the voltage value V of the battery BAT at that time by the current value I of the battery BAT at that time. For example, the calculation unit 21 calculates the internal resistance value R at a certain time of the battery BAT at a predetermined cycle while the vehicle 10 is traveling, and stores the calculated internal resistance value R in the storage device of the control device 20 or the like.

Figure 2:
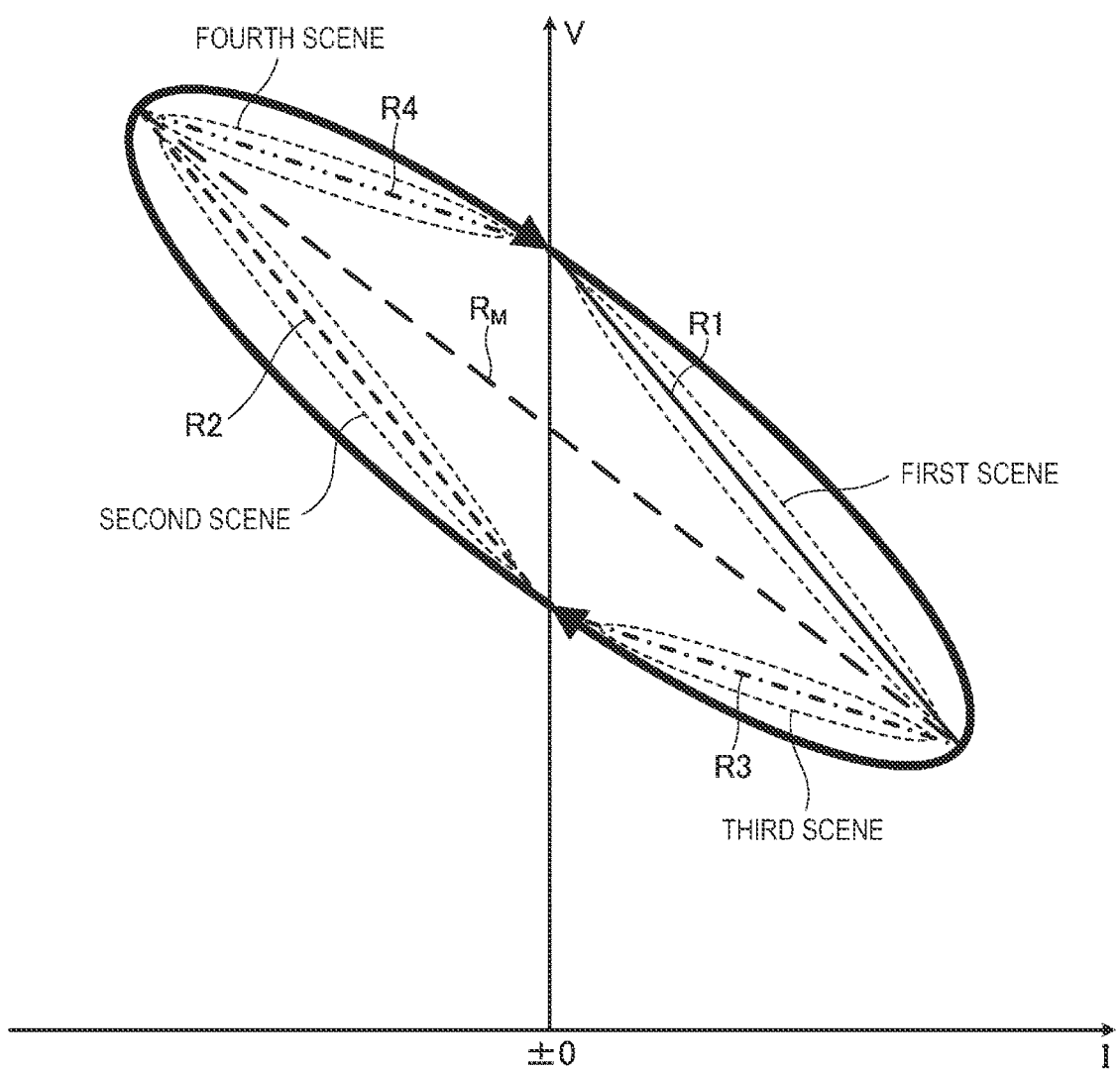
FIG. 2 is a diagram showing an example of each scene from a first scene to a fourth scene in which a current value I of a battery BAT changes in the vehicle 10.

In the vehicle 10, four scenes from a first scene to a fourth scene shown in FIG. 2 may occur with respect to the battery BAT. In FIG. 2, a vertical axis represents the voltage value V of the battery BAT, and a horizontal axis represents the current value I of the battery BAT. That is, in FIG. 2, a ratio (that is, a slope) of change in the voltage value V to change in the current value I represents the internal resistance value R of the battery BAT. Hereinafter, each scene from the first scene to the fourth scene will be described.

The first scene is a scene in which the current value I of the battery BAT takes a positive value and increases. For example, the first scene may occur when the accelerator pedal is depressed (that is, the operation amount on the accelerator pedal increases) while the vehicle 10 is driven by the power output from the first motor generator MG1 by at least the electricity supplied by the battery BAT. In such a first scene, the internal resistance value R of the battery BAT takes a relatively large value. Specifically, assuming that the internal resistance value R of the battery BAT in the first scene is an internal resistance value R1, the internal resistance value R1 is greater than an internal resistance value $R_M$, which is an average value of the internal resistance values R of the battery BAT in each scene from the first scene to the fourth scene. For example, the calculation unit 21 calculates an average value of the internal resistance values R of the battery BAT in each period included in the first scene as the internal resistance value R1. The internal resistance value R1 is an example of a third internal resistance value in the present invention.

The second scene is a scene in which the current value I of the battery BAT takes a negative value and decreases. For example, the second scene may occur when the brake pedal is depressed (that is, the operation amount on the brake pedal increases) while the vehicle 10 is traveling. In such a second scene, the internal resistance value R of the battery BAT takes a relatively large value. Specifically, assuming that the internal resistance value R of the battery BAT in the second scene is an internal resistance value R2, the internal resistance value R2 is greater than the internal resistance value $R_M$. For example, the calculation unit 21 calculates an average value of the internal resistance values R of the battery BAT in each period included in the second scene as the internal resistance value R2. The internal resistance value R2 is an example of a fourth internal resistance value in the present invention.

The third scene is a scene in which the current value I of the battery BAT takes a positive value and decreases. For example, the third scene may occur when the operation amount on the accelerator pedal decreases (that is, the accelerator pedal is released) while the vehicle 10 is driven by the power output from the first motor generator MG1 by at least the electricity supplied by the battery BAT. In such a third scene, the internal resistance value R of the battery BAT takes a relatively small value. Specifically, assuming that the internal resistance value R of the battery BAT in the third scene is an internal resistance value R3, the internal resistance value R3 is smaller than the internal resistance value $R_M$. For example, the calculation unit 21 calculates an average value of the internal resistance values R of the battery BAT in each period included in the third scene as the internal resistance value R3. The internal resistance value R3 is an example of a fifth internal resistance value in the present invention.

The fourth scene is a scene in which the current value I of the battery BAT takes a negative value and increases. For example, the fourth scene may occur when the operation amount on the brake pedal decreases (that is, the brake pedal is released) while the vehicle 10 is decelerating due to brake. In such a fourth scene, the internal resistance value R of the battery BAT takes a relatively small value. Specifically, assuming that the internal resistance value R of the battery BAT in the fourth scene is an internal resistance value R4, the internal resistance value R4 is smaller than the internal resistance value $R_M$. For example, the calculation unit 21 calculates an average value of the internal resistance values R of the battery BAT in each period included in the fourth scene as the internal resistance value R4. The internal resistance value R4 is an example of a sixth internal resistance value in the present invention.

When the internal resistance value R1, the internal resistance value R2, the internal resistance value R3, and the internal resistance value R4 are calculated, respectively, the calculation unit 21 calculates an internal resistance value $R_L$, which is the internal resistance value R of the battery BAT when an absolute value of the current value I of the battery BAT increases, based on the internal resistance value R1 and the internal resistance value R2. The internal resistance value $R_L$ is, for example, an average value of the internal resistance value R1 and the internal resistance value R2, and is greater than the internal resistance value $R_M$. The internal resistance value $R_L$ is an example of a first internal resistance value in the present invention.

Further, the calculation unit 21 calculates an internal resistance value $R_S$, which is the internal resistance value R of the battery BAT when the absolute value of the current value I of the battery BAT decreases, based on the internal resistance value R3 and the internal resistance value R4. The internal resistance value $R_S$ is, for example, an average value of the internal resistance value R3 and the internal resistance value R4, and is smaller than the internal resistance value $R_M$. The internal resistance value $R_S$ is an example of a second internal resistance value in the present invention.

The internal resistance value $R_M$, which is the average value of the internal resistance value R1, the internal resistance value R2, the internal resistance value R3, and the internal resistance value R4, can be said to be an average value of the internal resistance value $R_L$ and the internal resistance value $R_S$.

The derivation unit 22 derives the estimated internal resistance value $R_{now}$, which is an estimated value of the current internal resistance of the battery BAT based on the internal resistance value R of the battery BAT calculated by the calculation unit 21 and the voltage value V of the battery BAT. Specifically, assuming that the current voltage value V of the battery BAT is a voltage value $V_{now}$, as a difference between an upper limit voltage value $V_{H\_limit}$ of the battery BAT and the voltage value $V_{now}$ is smaller, in other words, as the voltage value $V_{now}$ is closer to the upper limit voltage value $V_{H\_limit}$, the derivation unit 22 derives a greater value as the estimated internal resistance value $R_{now}$. Here, the voltage value $V_{now}$ in this case is assumed to be equal to or smaller than the upper limit voltage value $V_{H\_limit}$. The upper limit voltage value $V_{H\_limit}$ is predetermined.

As an example, in the present embodiment, when the voltage value $V_{now}$ is equal to or smaller than the upper limit voltage value $V_{H\_limit}$, and the difference between the upper limit voltage value $V_{H\_limit}$ and the voltage value $V_{now}$ is equal to or smaller than a predetermined threshold value $V_A$ (that is, $V_{H\_limit} - V_{now} \leq V_A$), the derivation unit 22 derives the estimated internal resistance value $R_{now}$ by the following Equation (1).

[Eq. 1]
$$R_{now} = R_L + (R_L - R_M) \times K_A \times \left(1 - \frac{V_{H\_limit} - V_{now}}{V_A}\right) \quad (1)$$

In the above Equation (1), the coefficient $K_A$ is a predetermined constant (here, $K_A > 0$). Considering that the internal resistance value $R_M$ is the average value of the internal resistance value $R_L$ and the internal resistance value $R_S$, in the above Equation (1), $(R_L - R_M) * K_A$ can also be expressed as $(R_L - R_S) * K_A / 2$, and can be said to be a value obtained by multiplying a difference between the internal resistance value $R_L$ and the internal resistance value $R_S$ by a predetermined coefficient.

In the present embodiment, when the voltage value $V_{now}$ is equal to or smaller than the upper limit voltage value $V_{H\_limit}$, and the difference between the upper limit voltage value $V_{H\_limit}$ and the voltage value $V_{now}$ is greater than the predetermined threshold value $V_A$ (that is, $V_{H\_limit} - V_{now} > V_A$), the derivation unit 22 derives a value calculated as the internal resistance value $R_L$ as the estimated internal resistance value $R_{now}$.

On the other hand, when the voltage value $V_{now}$ is greater than the upper limit voltage value $V_{H\_limit}$, that is, when an overshoot in which the voltage value $V_{now}$ exceeds the upper limit voltage value $V_{H\_limit}$ (hereinafter also simply referred to as "overshoot") occurs, as the difference between the voltage value $V_{now}$ and the upper limit voltage value $V_{H\_limit}$ (that is, an amount of overshoot) is greater, the derivation unit 22 derives a smaller value as the estimated internal resistance value $R_{now}$.

As an example, in the present embodiment, when the voltage value $V_{now}$ is greater than the upper limit voltage value $V_{H\_limit}$, the derivation unit 22 derives the estimated internal resistance value $R_{now}$ by the following Equation (2).

[Eq. 2]
$$R_{now} = (R_L + (R_L - R_M) \times K_A) \times \left(1 - \frac{V_{now} - V_{H\_limit}}{V_B}\right) + \{R_S + (R_S - R_M) \times K_B\} \times \left(\frac{V_{now} - V_{H\_limit}}{V_B}\right) \quad (2)$$

In the above Equation (2), the coefficient $K_A$ is the same as the coefficient $K_A$ in the above Equation (1), and the coefficient $K_B$ is a predetermined constant (here, $K_B > 0$). In the above Equation (2), $V_B$ is a threshold value related to voltage and is predetermined.

The setting unit 23 sets the charging electricity upper limit value $TW_{IN\_now}$, which is the upper limit value of the charging electricity for charging the battery BAT, based on the estimated internal resistance value $R_{now}$, derived by the derivation unit 22, the voltage value V of the battery BAT, and the current value I of the battery BAT. Specifically, assuming that the current value I at present of the battery BAT is a current value $I_{now}$, the setting unit 23 sets the charging electricity upper limit value $TW_{IN\_now}$ based on the estimated internal resistance value $R_{now}$, the voltage value $V_{now}$, and the current value $I_{now}$.

Here, when the battery BAT is charged with the internal resistance value R of the battery BAT as the estimated internal resistance value $R_{now}$, the charging electricity upper limit value $TW_{IN\_now}$ can be an electricity when the voltage value V of the battery BAT is the upper limit voltage value $V_{H\_limit}$, and can be derived by, for example, the following Equation (3).

[Eq. 3]

$$TW_{IN\_now} = \frac{I_{now} \times R_{now} + V_{now} - V_{H\_limit}}{R_{now}} \times V_{H\_limit} \quad (3)$$

Then, when the battery BAT is charged, the control device 20 controls so that no charging electricity exceeding the charging electricity upper limit value $TW_{IN\_now}$ set by the setting unit 23 is supplied to the battery BAT. The charging electricity can be controlled by, for example, controlling the electricity conversion device 11.

As described above, in the vehicle 10, there may be a time when the absolute value of the current value I of the battery BAT increases and a time when the absolute value of the current value I of the battery BAT decreases, depending on a driving condition (in other words, due to influence of an operation of a power train such as the first motor generator MG1). When the absolute value of the current value I of the battery BAT increases, the internal resistance value R tends to increase, and when the absolute value of the current value I of the battery BAT decreases, the internal resistance value R tends to decrease. This is because, when the absolute value of the current value I of the battery BAT increases, an RC parallel component contained in an internal resistance of the battery BAT increases, and when the absolute value of the current value I of the battery BAT decreases, the RC parallel component contained in the internal resistance of the battery BAT becomes smaller.

In the present embodiment, the calculation unit 21 calculates the internal resistance value $R_L$ when the absolute value of the current value I of the battery BAT increases (that is, when the RC parallel component contained in the internal resistance of the battery BAT is large), and the internal resistance value $R_S$ when the absolute value of the current value I of the battery BAT decreases (that is, when the RC parallel component contained in the internal resistance of the battery BAT is small). Accordingly, the derivation unit 22 can derive the estimated internal resistance value $R_{now}$ considering the internal resistance value $R_L$ when the RC parallel component contained in the internal resistance of the battery BAT is large and the internal resistance value $R_S$ when the RC parallel component contained in the internal resistance of the battery BAT is small.

The RC parallel component contained in the internal resistance of the battery BAT may increase due to a change (for example, deterioration) in a state of the electricity storage cell of the battery BAT, and in such a case, either the internal resistance value $R_L$ or the internal resistance value $R_S$ will increase. Therefore, by deriving the estimated internal resistance value $R_{now}$ in consideration of the internal resistance value $R_L$ and the internal resistance value $R_S$, even if the state of the electricity storage cell of the battery BAT changes, the derivation unit 22 can derive an appropriate estimated internal resistance value $R_{now}$ that reflects the change in the state.

Further, in the present embodiment, the calculation unit 21 calculates the internal resistance value $R_L$ based on the internal resistance value R1 when the current value I of the battery BAT takes a positive value and increases, and the internal resistance value R2 when the current value I of the battery BAT takes a negative value and decreases. In this way, it becomes possible to appropriately calculate the internal resistance value $R_L$ when the RC parallel component contained in the internal resistance of the battery BAT is large.

In the present embodiment, the calculation unit 21 calculates the internal resistance value $R_S$ based on the internal resistance value R3 when the current value I of the battery BAT takes a positive value and decreases, and the internal resistance value R4 when the current value I of the battery BAT takes a negative value and increases. In this way, it becomes possible to appropriately calculate the internal resistance value $R_S$ when the RC parallel component contained in the internal resistance of the battery BAT is small.

[Characteristics of Estimated Internal Resistance Value]

Figure 3:
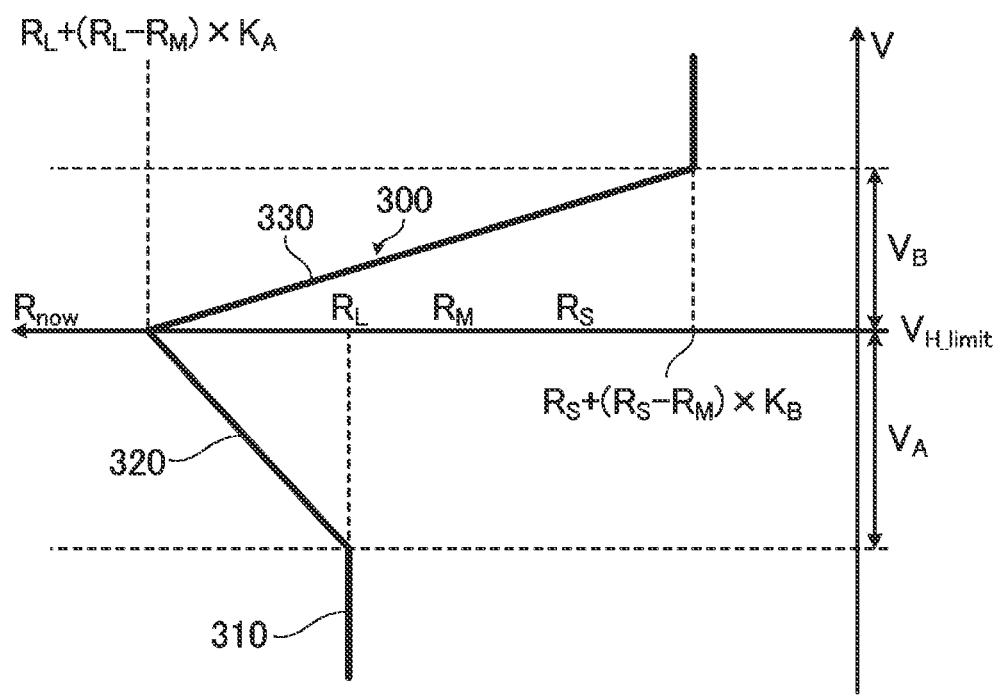
FIG. 3 is a diagram showing a characteristic 300 of an estimated internal resistance value $R_{now}$ derived by a control device 20.
Figure 4:
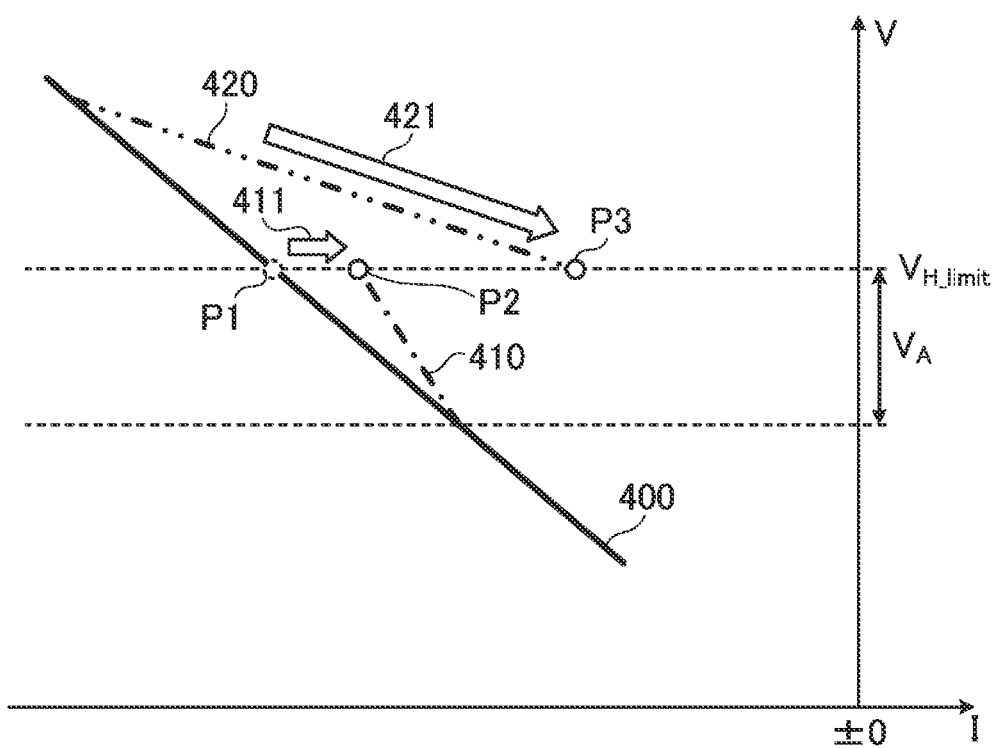
FIG. 4 is a diagram showing an example of change in a charging electricity upper limit value $TW_{IN\_now}$ with change in the estimated internal resistance value $R_{now}$.
Figure 5:
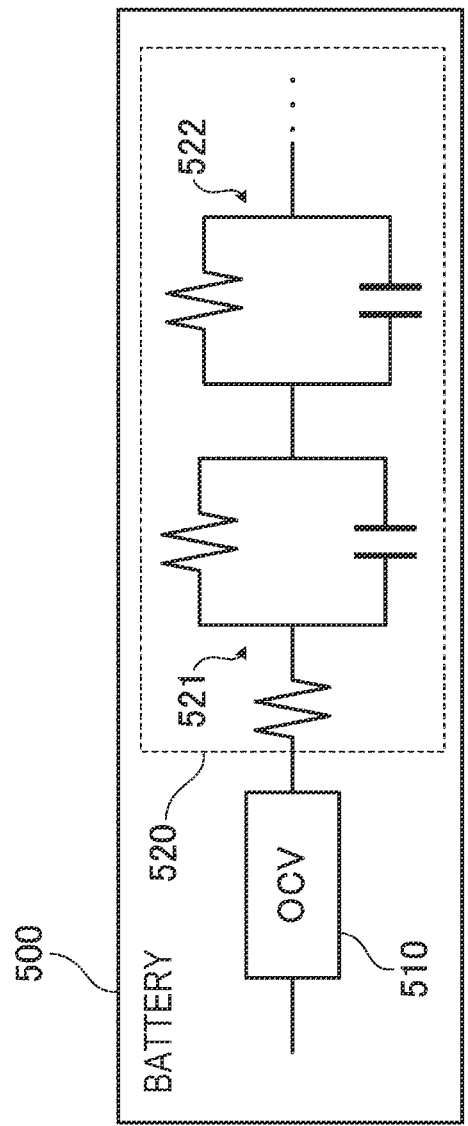
FIG. 5 is a diagram showing an equivalent circuit model 500 of the battery.

Next, characteristics of the estimated internal resistance value $R_{now}$ derived by the control device 20 will be summarized with reference to FIGS. 3 and 4. In FIG. 3, a vertical axis represents the voltage value V of the battery BAT, and a horizontal axis represents the estimated internal resistance value $R_{now}$. In FIG. 4, a vertical axis represents the voltage value V of the battery BAT, and a horizontal axis represents the current value I of the battery BAT.

A characteristic 300 shown in FIG. 3 is an example of the characteristics of the estimated internal resistance value $R_{now}$ derived by the control device 20. As shown by a part with a reference numeral 310 of the characteristic 300 shown in FIG. 3, when the voltage value $V_{now}$ is equal to or smaller than the upper limit voltage value $V_{H\_limit}$, and the difference between the upper limit voltage value $V_{H\_limit}$ and the voltage value $V_{now}$ is greater than the threshold value $V_A$, the estimated internal resistance value $R_{now}$ takes a value calculated as the internal resistance value $R_L$.

In this way, the control device 20 uses the value calculated as the internal resistance value $R_L$ as the estimated internal resistance value $R_{now}$, when the voltage value $V_{now}$ is equal to or smaller than the upper limit voltage value $V_{H\_limit}$, and the voltage value $V_{now}$ deviates to some extent from the upper limit voltage value $V_{H\_limit}$. As a result, a processing load for obtaining the estimated internal resistance value $R_{now}$ can be reduced as compared with a case where the estimated internal resistance value $R_{now}$ is obtained separately from the internal resistance value $R_L$. The control device 20 uses the value calculated as the internal resistance value $R_L$ as the estimated internal resistance value $R_{now}$, and controls the charging electricity of the battery BAT using the estimated internal resistance value $R_{now}$, so that it is possible to prevent occurrence of the overshoot while enabling time-efficient charging without reducing the charging electricity of the battery BAT too much.

As shown by a part with a reference numeral 320 of the characteristic 300 shown in FIG. 3, when the voltage value $V_{now}$ is equal to or smaller than the upper limit voltage value $V_{H\_limit}$, and the difference between the upper limit voltage value $V_{H\_limit}$ and the voltage value $V_{now}$ is equal to or smaller than the threshold value $V_A$, the estimated internal resistance value $R_{now}$ takes a greater value as the difference between the upper limit voltage value $V_{H\_limit}$ and the voltage value $V_{now}$, is smaller (that is, as the voltage value $V_{now}$ is closer to the upper limit voltage value $V_{H\_limit}$). When the voltage value $V_{now}$ is equal to the upper limit voltage value $V_{H\_limit}$, the estimated internal resistance value $R_{now}$ takes the maximum value of $R_L+(R_L-R_M)*K_A$.

In this way, the control device 20 increases the estimated internal resistance value $R_{now}$ as the voltage value $V_{now}$ is closer to the upper limit voltage value $V_{H\_limit}$, when the voltage value $V_{now}$ is equal to or smaller than the upper limit voltage value $V_{H\_limit}$, and the voltage value $V_{now}$ is close to the upper limit voltage value $V_{H\_limit}$. In this way, as the voltage value $V_{now}$ approaches the upper limit voltage value $V_{H\_limit}$, the charging electricity upper limit value $TW_{IN\_now}$ can be reduced. Therefore, as the voltage value $V_{now}$ approaches the upper limit voltage value $V_{H\_limit}$, it becomes possible to reduce the charging electricity of the battery BAT, and it is possible to prevent the occurrence of overshoot.

Specifically, with reference to FIG. 4, P1 is assumed to be the charging electricity upper limit value $TW_{IN\_now}$ corresponding to the estimated internal resistance value $R_{now}$ immediately before the difference between the upper limit voltage value $V_{H\_limit}$ and the voltage value $V_{now}$ becomes equal to or smaller than the threshold value $V_A$. In this case, as shown in FIG. 4, P1 can be represented by an intersection of a solid line 400 having a slope corresponding to the estimated internal resistance value $R_{now}$ immediately before the difference from the voltage value $V_{now}$ becomes equal to or smaller than the threshold value $V_A$, and a broken line representing the upper limit voltage value $V_{H\_limit}$.

Here, P2 is assumed to be the charging electricity upper limit value $TW_{IN\_now}$ corresponding to the estimated internal resistance value $R_{now}$ when the difference between the upper limit voltage value $V_{H\_limit}$ and the voltage value $V_{now}$ becomes equal to or smaller than the threshold value $V_A$. In this case, as shown in FIG. 4, P2 can be represented by an intersection of a dashed line 410 having a slope corresponding to the estimated internal resistance value $R_{now}$ when the difference from the voltage value $V_{now}$ becomes equal to or smaller than the threshold value $V_A$, and the broken line representing the upper limit voltage value $V_{H\_limit}$. Therefore, in the example shown in FIG. 4, as indicated by avoid arrow with a reference numeral 411 in FIG. 4, the charging electricity upper limit value $TW_{IN\_now}$ is reduced to P2 in response to the difference between the upper limit voltage value $V_{H\_limit}$ and the voltage value $V_{now}$ becoming equal to or smaller than the threshold value $V_A$.

As shown by a part with a reference numeral 330 of the characteristic 300 shown in FIG. 3, when the voltage value $V_{now}$ is greater than the upper limit voltage value $V_{H\_limit}$ (that is, when the overshoot occurs), the estimated internal resistance value $R_{now}$ takes a smaller value as the difference between the voltage value $V_{now}$ and the upper limit voltage value $V_{H\_limit}$ (that is, the amount of overshoot) is greater. When the difference between the voltage value $V_{now}$ and the upper limit voltage value $V_{H\_limit}$ becomes equal to or greater than the threshold value $V_B$, the estimated internal resistance value $R_{now}$ takes the minimum value of $R_S+(R_S-R_M)*K_B$.

In this way, when overshoot occurs, the control device 20 reduces the estimated internal resistance value $R_{now}$ as the overshoot amount increases. As a result, the charging electricity upper limit value $TW_{IN\_now}$ can be reduced as the amount of overshoot increases. Therefore, it is possible to reduce the charging electricity of the battery BAT as the amount of overshoot increases, and promote correction (elimination) of the overshoot state at an early stage.

Specifically, with reference to FIG. 4, as the overshoot occurs, for example, it is assumed that the estimated internal resistance value $R_{now}$ represented by the slope of the solid line 400 is reduced to the estimated internal resistance value $R_{now}$ represented by a slope of a two-dot chain line 420. Here, assuming that the charging electricity upper limit value $TW_{IN\_now}$ corresponding to the estimated internal resistance value $R_{now}$ represented by the slope of the two-dot chain line 420 is P3, P3 can be represented by an intersection of the two-dot chain line 420 and the broken line representing the upper limit voltage value $V_{H\_limit}$. Therefore, in the example shown in FIG. 4, as indicated by a void arrow with a reference numeral 421 in FIG. 4, by reducing the charging electricity upper limit value $TW_{IN\_now}$ to P3 as the overshoot occurs, it is possible to promote the correction of the overshoot state.

For example, the estimated internal resistance value $R_{now}$ may be derived by an equation other than the above Equation (1) or (2) as long as the estimated internal resistance value $R_{now}$ is greater as the difference between the upper limit voltage value $V_{H\_limit}$ and the voltage value $V_{now}$ is smaller. In this case, the estimated internal resistance value $R_{now}$ may be derived using at least one of the internal resistance value $R_L$, the internal resistance value $R_S$, and a value obtained by multiplying a difference between the internal resistance value $R_L$ and the internal resistance value $R_S$ by a predetermined coefficient.

In the above, an example in which the control device 20 controls the charging of the battery BAT in consideration of the internal resistance that changes in conjunction with the IV characteristic of the battery BAT is described, but the present invention is not limited to this example. In place of or in addition to the charging control of the battery BAT described above, the control device 20 may control the discharge from the battery BAT in consideration of the internal resistance that changes in conjunction with the IV characteristic of the battery BAT.

Specifically, in this case, the derivation unit 22 of the control device 20 derives the estimated internal resistance value $R_{now}$ based on the internal resistance value R of the battery BAT calculated by the calculation unit 21 and the voltage value V of the battery BAT. Specifically, the derivation unit 22 derives a greater value as the estimated internal resistance value $R_{now}$ as a difference between the voltage value $V_{now}$ and a lower limit voltage value $V_{L\_limit}$ of the battery BAT is smaller, in other words, as the voltage value $V_{now}$ is closer to the lower limit voltage value $V_{L\_limit}$. Here, the voltage value $V_{now}$ in this case is assumed to be equal to or greater than the lower limit voltage value $V_{L\_limit}$. The lower limit voltage value $V_{L\_limit}$ is predetermined.

The setting unit 23 sets the discharging electricity upper limit value $TW_{OUT\_now}$, which is the upper limit value of the discharging electricity discharged from the battery BAT, based on the estimated internal resistance value $R_{now}$ derived by the derivation unit 22, the voltage value V of the battery BAT, and the current value I of the battery BAT. Specifically, the setting unit 23 sets the discharging electricity upper limit value $TW_{OUT\_now}$ based on the estimated internal resistance value ROW, the voltage value $V_{now}$, and the current value $I_{now}$.

Here, when the battery BAT is discharged with the internal resistance value R of the battery BAT as the estimated internal resistance value $R_{now}$, the discharging electricity upper limit value $TWO_{OUT\_now}$ can be an electricity when the voltage value V of the battery BAT becomes the lower limit voltage value $V_{L\_limit}$, and can be derived by, for example, the following Equation (4).

[Eq. 4]

$$TW_{OUT\_now} = \frac{I_{now} \times R_{now} + V_{now} - V_{L\_limit}}{R_{now}} \times V_{L\_limit} \quad (4)$$

Then, when the battery BAT is discharged, the control device 20 controls so that no discharging electricity exceeding the discharging electricity upper limit value $TW_{OUT\_now}$ set by the setting unit 23 is output from the battery BAT. In this way, the control device 20 can discharge from the battery BAT with an appropriate discharging electricity considering the internal resistance that changes in conjunction with the IV characteristic of the battery BAT. Therefore, it is possible to ensure the output of the vehicle 10 (for example, the first motor generator MG1) without reducing the discharging electricity too much, and it is possible to prevent over-discharge from the battery BAT. The discharging electricity can be controlled by, for example, controlling the electricity conversion device 11.

As described above, according to the vehicle electricity storage system 50 of the present embodiment, the charging or discharging of the battery BAT can be appropriately controlled in consideration of the internal resistance that changes in conjunction with the IV characteristic of the battery BAT.

Although the embodiment of the present invention has been described above, the present invention is not limited to the above-described embodiment, and modifications, improvements, and the like can be made as appropriate.

For example, in the above-described embodiment, the example in which the vehicle electricity storage system 50 is mounted on the vehicle 10, which is a hybrid electric vehicle, has been described, but the present invention is not limited to this example. For example, the vehicle 10 equipped with the vehicle electricity storage system 50 may be an electric vehicle or a fuel vehicle.

At least the following matters are described in the present description. Although the corresponding components or the like in the above-described embodiment are shown in parentheses, the present invention is not limited thereto.

(1) A vehicle electricity storage system (vehicle electricity storage system 50), including:
a battery (battery BAT);
a voltage sensor (voltage sensor 12a) configured to detect a voltage value of the battery;
a current sensor (current sensor 12b) configured to detect a current value of the battery; and
a control device (control device 20) configured to control charging of the battery based on the voltage value detected by the voltage sensor and the current value detected by the current sensor, in which
the control device includes
a calculation unit (calculation unit 21) configured to calculate an internal resistance value of the battery based on the voltage value and the current value,
a derivation unit (derivation unit 22) configured to derive an estimated internal resistance value, which is an estimated value of the current internal resistance of the battery, based on the internal resistance value calculated by the calculation unit and the current voltage value, and
a setting unit (setting unit 23) configured to set a charging electricity upper limit value, which is an upper limit value of charging electricity for charging the battery, based on the estimated internal resistance value derived by the derivation unit, the current voltage value, and a current value at present, and
the derivation unit is configured to derive a greater value as the estimated internal resistance value as a difference between an upper limit voltage value of the battery and the current voltage value becomes smaller.

According to (1), the smaller the difference between the upper limit voltage value of the battery and the current voltage value, the greater the value derived as the estimated internal resistance value of the current battery is derived, and the upper limit of the charging electricity of the battery can beset based on the derived estimated internal resistance value. Accordingly, it is possible to appropriately control the charging of the battery considering the internal resistance of the battery that changes in conjunction with the non-linear current-voltage characteristic (IV characteristic) of the battery.

(2) The vehicle electricity storage system according to (1), in which
the calculation unit is configured to calculate
a first internal resistance value, which is the internal resistance value when an absolute value of the current value increases, and
a second internal resistance value, which is the internal resistance value when the absolute value of the current value decreases, and
the derivation unit is configured to derive the estimated internal resistance value using at least one of the first internal resistance value, the second internal resistance value, and a value obtained by multiplying a difference between the first internal resistance value and the second internal resistance value by a predetermined coefficient.

When the absolute value of the current value of the battery increases, the RC parallel component contained in the internal resistance of the battery increases, so that the internal resistance of the battery is assumed to increase. On the other hand, when the absolute value of the current value of the battery decreases, the RC parallel component contained in the internal resistance of the battery decreases, so that the internal resistance of the battery is assumed to decrease. According to (2), it is possible to derive the estimated internal resistance value considering the first internal resistance value when the absolute value of the current value of the battery increases (that is, when the RC parallel component contained in the internal resistance of the battery is large), and the second internal resistance value when the absolute value of the current value of the battery decreases (that is, when the RC parallel component contained in the internal resistance of the battery is small).

(3) The vehicle electricity storage system according to (2), in which
the calculation unit is configured to calculate
a third internal resistance value, which is the internal resistance value when the current value takes a positive value and increases,
a fourth internal resistance value, which is the internal resistance value when the current value takes a negative value and decreases,
a fifth internal resistance value, which is the internal resistance value when the current value takes a positive value and decreases, and
a sixth internal resistance value, which is the internal resistance value when the current value takes a negative value and increases, the calculation unit is configured to calculate the first internal resistance value based on the third internal resistance value and the fourth internal resistance value, and the calculation unit is configured to calculate the second internal resistance value based on the fifth internal resistance value and the sixth internal resistance value.

According to (3), the first internal resistance value can be calculated based on the third internal resistance value when the current value of the battery takes a positive value and increases, and the fourth internal resistance value when the current value of the battery takes a negative value and decreases. In this way, it is possible to appropriately calculate the first internal resistance value when the RC parallel component contained in the internal resistance of the battery is large. According to (3), the second internal resistance value can be calculated based on the fifth internal resistance value when the current value of the battery takes a positive value and decreases, and the sixth internal resistance value when the current value of the battery takes a negative value and increases. In this way, it is possible to appropriately calculate the second internal resistance value when the RC parallel component contained in the internal resistance of the battery is small.

(4) The vehicle electricity storage system according to (2) or (3), in which the derivation unit is configured to derive a greater value as the estimated internal resistance value as the difference between the upper limit voltage value and the current voltage value becomes smaller, when the current voltage value is equal to or smaller than the upper limit voltage value and the difference between the upper limit voltage value and the current voltage value is equal to or smaller than a threshold value.

According to (4), by deriving a greater value as the estimated internal resistance value as the difference between the upper limit voltage value and the current voltage value is smaller when the current voltage value of the battery is equal to or smaller than the upper limit voltage value and the difference between the upper limit voltage value and the current voltage value is equal to or smaller than a threshold value, the charging electricity upper limit value can be reduced as the voltage value of the battery approaches the upper limit voltage value. Therefore, as the voltage value of the battery approaches the upper limit voltage value, it becomes possible to reduce the charging electricity of the battery, and it is possible to prevent the occurrence of overshoot in which the voltage value of the battery exceeds the upper limit voltage value.

(5) The vehicle electricity storage system according to (4), in which the derivation unit is configured to derive the estimated internal resistance value based on a sum of the first internal resistance value and a value obtained by multiplying the difference between the first internal resistance value and the second internal resistance value by a coefficient, when the current voltage value is equal to or smaller than the upper limit voltage value and the difference between the upper limit voltage value and the current voltage value is equal to or smaller than the threshold value.

According to (5), it is possible to derive the estimated internal resistance value based on the sum of the first internal resistance value and a value obtained by multiplying the difference between the first internal resistance value and the second internal resistance value by a coefficient, when the current voltage value of the battery is equal to or smaller the upper limit voltage value and the difference between the upper limit voltage value and the current voltage value is equal to or smaller than the threshold value. Accordingly, it is possible to derive a greater value as the estimated internal resistance value as the difference between the upper limit voltage value and the current voltage value is smaller, when the current voltage value of the battery is equal to or smaller than the upper limit voltage value and the difference between the upper limit voltage value and the current voltage value is equal to or smaller than a threshold value.

(6) The vehicle electricity storage system according to (4) or (5), in which the derivation unit is configured to derive a value calculated as the first internal resistance value as the estimated internal resistance value, when the current voltage value is equal to or smaller than the upper limit voltage value and the difference between the upper limit voltage value and the current voltage value is greater than the threshold value.

According to (6), by deriving a value calculated as the first internal resistance value as the estimated internal resistance value when the current voltage value of the battery is equal to or smaller than the upper limit voltage value and the difference between the upper limit voltage value and the current voltage value is greater than a threshold value, it is possible to charge the battery with an appropriate charging electricity while reducing the processing load for obtaining the estimated internal resistance value.

(7) The vehicle electricity storage system according to any one of (4) to (6), in which the derivation unit is configured to derive a smaller value as the estimated internal resistance value as the difference between the current voltage value and the upper limit voltage value becomes greater, when the current voltage value is greater than the upper limit voltage value.

According to (7), when the voltage value of the battery exceeds the upper limit voltage value and overshoot occurs, the greater the difference between the current voltage value and the upper limit voltage value (that is, the overshoot amount), the smaller the estimated internal resistance value, which makes it becomes possible to reduce the charging electricity upper limit value. Therefore, it is possible to reduce the charging electricity of the battery when the overshoot occurs, so as to promote the correction (elimination) of the overshoot state at an early stage.

(8) A vehicle electricity storage system (vehicle electricity storage system 50), including:

a battery (battery BAT);

a voltage sensor (voltage sensor 12a) configured to detect a voltage value of the battery;

a current sensor (current sensor 12b) configured to detect a current value of the battery; and a control device (control device 20) configured to control discharging from the battery based on the voltage value detected by the voltage sensor and the current value detected by the current sensor, in which the control device includes a calculation unit (calculation unit 21) configured to calculate an internal resistance value of the battery based on the voltage value and the current value, a derivation unit (derivation unit 22) configured to derive an estimated internal resistance value, which is an estimated value of the current internal resistance of the battery, based on the internal resistance value calculated by the calculation unit and the current voltage value, and a setting unit (setting unit 23) configured to set a discharging electricity upper limit value, which is an upper limit value of discharging electricity discharged from the battery, based on the estimated internal resistance value derived by the derivation unit, the current voltage value, and the current value, and the derivation unit derives a greater value as the estimated internal resistance value as a difference between a lower limit voltage value of the battery and the current voltage value becomes smaller.

According to (8), the smaller the difference between the upper limit voltage value of the battery and the current voltage value, the greater the value derived as the estimated internal resistance value of the current battery is derived, and the discharging electricity upper limit value of the battery can be set based on the derived estimated internal resistance value. Accordingly, it becomes possible to appropriately control the discharging from the battery considering the internal resistance of the battery that changes in conjunction with the non-linear current-voltage characteristic (IV characteristic) of the battery.

The invention claimed is:

1. A vehicle electricity storage system, comprising:
a battery;
a voltage sensor configured to detect a voltage value of the battery;
a current sensor configured to detect a current value of the battery; and
a control device configured to control charging of the battery based on the voltage value detected by the voltage sensor and the current value detected by the current sensor, wherein
the control device includes
    a calculation unit configured to calculate an internal resistance value of the battery based on the voltage value and the current value;
    a derivation unit configured to derive an estimated internal resistance value, which is an estimated value of a current internal resistance of the battery, based on the internal resistance value calculated by the calculation unit and a current voltage value; and
    a setting unit configured to set a charging electricity upper limit value, which is an upper limit value of charging electricity for charging the battery, based on the estimated internal resistance value derived by the derivation unit, the current voltage value, and a current value at present,
the derivation unit is configured to derive a greater value as the estimated internal resistance value, as a difference between an upper limit voltage value of the battery and the current voltage value becomes smaller,
the calculation unit is configured to calculate
    a first internal resistance value, which is the internal resistance value when an absolute value of the current value increases, and
    a second internal resistance value, which is the internal resistance value when the absolute value of the current value decreases, and
the derivation unit is configured to derive the estimated internal resistance value using at least one of the first internal resistance value, the second internal resistance value, and a value obtained by multiplying a difference between the first internal resistance value and the second internal resistance value by a predetermined coefficient.

2. The vehicle electricity storage system according to claim 1, wherein
the calculation unit is configured to calculate
    a third internal resistance value, which is the internal resistance value when the current value takes a positive value and increases,
    a fourth internal resistance value, which is the internal resistance value when the current value takes a negative value and decreases,
    a fifth internal resistance value, which is the internal resistance value when the current value takes a positive value and decreases, and
    a sixth internal resistance value, which is the internal resistance value when the current value takes a negative value and increases,
the calculation unit is configured to calculate the first internal resistance value based on the third internal resistance value and the fourth internal resistance value, and
the calculation unit is configured to calculate the second internal resistance value based on the fifth internal resistance value and the sixth internal resistance value.

3. The vehicle electricity storage system according to claim 1, wherein
the derivation unit is configured to derive a greater value as the estimated internal resistance value as the difference between the upper limit voltage value and the current voltage value becomes smaller, when the current voltage value is equal to or smaller than the upper limit voltage value and the difference between the upper limit voltage value and the current voltage value is equal to or smaller than a threshold value.

4. The vehicle electricity storage system according to claim 3, wherein
the derivation unit is configured to derive the estimated internal resistance value based on a sum of the first internal resistance value and a value obtained by multiplying the difference between the first internal resistance value and the second internal resistance value by a coefficient, when the current voltage value is equal to or smaller than the upper limit voltage value and the difference between the upper limit voltage value and the current voltage value is equal to or smaller than the threshold value.

5. The vehicle electricity storage system according to claim 3, wherein
the derivation unit derives a value calculated as the first internal resistance value as the estimated internal resistance value, when the current voltage value is equal to or smaller than the upper limit voltage value and the difference between the upper limit voltage value and the current voltage value is greater than the threshold value.

6. The vehicle electricity storage system according to claim 3, wherein
the derivation unit is configured to derive a smaller value as the estimated internal resistance value as the difference between the current voltage value and the upper limit voltage value becomes greater, when the current voltage value is greater than the upper limit voltage value.

7. A vehicle electricity storage system, comprising:
a battery;
a voltage sensor configured to detect a voltage value of the battery;
a current sensor configured to detect a current value of the battery; and a control device configured to control discharging from the battery based on the voltage value detected by the voltage sensor and the current value detected by the current sensor, wherein the control device includes
- a calculation unit configured to calculate an internal resistance value of the battery based on the voltage value and the current value,
- a derivation unit configured to derive an estimated internal resistance value, which is an estimated value of a current internal resistance of the battery, based on the internal resistance value calculated by the calculation unit and a current voltage value, and
- a setting unit configured to set a discharging electricity upper limit value, which is an upper limit value of discharging electricity discharged from the battery, based on the estimated internal resistance value derived by the derivation unit, the current voltage value, and a current value at present, the derivation unit is configured to derive a greater value as the estimated internal resistance value, as a difference between a lower limit voltage value of the battery and the current voltage value becomes smaller, the calculation unit is configured to calculate
- a first internal resistance value, which is the internal resistance value when an absolute value of the current value increases, and
- a second internal resistance value, which is the internal resistance value when the absolute value of the current value decreases, and the derivation unit is configured to derive the estimated internal resistance value using at least one of the first internal resistance value, the second internal resistance value, and a value obtained by multiplying a difference between the first internal resistance value and the second internal resistance value by a predetermined coefficient.

* * * * *